United States Patent [19]
Uhler et al.

[11] Patent Number: 6,043,567
[45] Date of Patent: Mar. 28, 2000

[54] VEHICLE ELECTRICAL SYSTEM

[75] Inventors: Rainer Uhler, Sinsheim; Markus Zimmer, Neu-Isenburg, both of Germany

[73] Assignee: Daimler-Benz Aktiengesellschaft, Stuttgart, Germany

[21] Appl. No.: 09/101,089

[22] PCT Filed: Dec. 7, 1996

[86] PCT No.: PCT/EP96/05490

§ 371 Date: Jul. 1, 1998

§ 102(e) Date: Jul. 1, 1998

[87] PCT Pub. No.: WO97/25771

PCT Pub. Date: Jul. 17, 1997

[30] Foreign Application Priority Data

Jan. 3, 1996 [DE] Germany ............ 196 00 074

[51] Int. Cl.[7] ............... B60L 11/02
[52] U.S. Cl. ............ 307/10.1; 318/154; 318/493
[58] Field of Search .................. 307/10.1, 9.1; 318/493, 501, 381, 154, 249, 79, 81, 84, 521; 322/59, 60

[56] References Cited

U.S. PATENT DOCUMENTS

| | | | |
|---|---|---|---|
| 4,143,280 | 3/1979 | Kuehn et al. | 290/9 |
| 4,191,914 | 3/1980 | Lecluse | 318/493 |
| 4,264,846 | 4/1981 | Sauer et al. | 318/249 |
| 5,642,023 | 6/1997 | Journey | 318/493 |

FOREIGN PATENT DOCUMENTS

| | | |
|---|---|---|
| 0 378 075 | 7/1990 | European Pat. Off. . |
| 0 631 372 | 12/1994 | European Pat. Off. . |
| 0 637 868 | 2/1995 | European Pat. Off. . |
| 40 41 220 | 7/1992 | Germany . |
| 44 19 006 | 12/1995 | Germany . |

OTHER PUBLICATIONS

Noon et al, "Design of a Multi–Module, Multi–Phase Battery Charge for the NASA EOS Space Platform Testbed", IECEC–92, San Diego, CA, Aug. 3–7, 1992, vol. 1, pp. 1.74–1.78.

*Primary Examiner*—Albert W. Paladini
*Attorney, Agent, or Firm*—Venable; George H. Spencer; Catherine M. Voorhees

[57] ABSTRACT

A new vehicle electrical system has a first lower voltage level and a second higher voltage level. The new vehicle electrical system comprises an ignition switch, a generator having an exciter circuit and a voltage controller, and a multi-chopper having several chopper stages. The voltage controller supplies energy to the exciter circuit via the ignition switch in order to adjust the first lower voltage level to a rated level of U1. The multi-chopper is connected between the battery and the generator, thereby adjusting the second higher voltage level to a rated level of U2 based on the number of chopper stages and their actuation.

9 Claims, 2 Drawing Sheets

VEHICLE ELECTRICAL SYSTEM

DESCRIPTION

The invention relates to a vehicle electrical system with a generator that has an exciter circuit which is influenced by a voltage controller wherein a first voltage level and a second, higher voltage level are provided.

In conventional electrical systems, electrical energy is usually generated with the aid of a three-phase generator. The three-phase generator voltage is converted by a diode rectifier to the required direct voltage for the vehicle electrical system. Circuits using rectifier diodes, Schottky diodes or Z-diodes are known for converting three-phase voltage to the required direct voltage. Moreover, combinations of various diode designs in a rectifier are conceivable as well. Parallel-connected diodes for increasing the maximum current can also be used as needed.

A voltage controller that is connected to the generator exciting circuit is used to adjust the amplitude for the rectifier output voltage to the value necessary for supplying voltage to the vehicle electrical system.

A vehicle electrical system having a higher medium voltage as compared to the battery voltage, as well as a high voltage, is known from the DE 40 41 220 A1, from which the invention starts. A joint medium voltage bus bar is provided, for which a stabilized voltage is maintained by a voltage-controlled converter arrangement. The system has the disadvantage that the battery is charged by a generator to the lowest voltage level, which results in higher losses in the generator, as compared to a generator that generates a higher voltage. The layout for a vehicle electrical system still widely used is based on the concept of adjusting to the generator output voltage. This concept has the disadvantage that all voltage drops occurring between generator and battery are not taken into account. The rated 12V voltage is present at the battery and at the majority of the electrical consumers or devices which consume electrical energy.

An electrical system for a satellite, having a battery voltage of 64–84V and a higher bus bar voltage of 120V is known from an article contributed to a conference by the Aerospace Power, San Diego, Aug. 3–7, 1992, Vol. 1, IEEE, pages 1.73–1.78, XP000366011, by J. P. Noon et al., 'Design of a Multi-module, Multi-phase Battery Charger for the NASA EOS Space Platform Testbed.' Solar panels feed energy into the bus and charge up the battery via several parallel-connected chopper stages. After dark, the bus bar voltage is obtained in a reverse operation from the battery voltage.

If particularly powerful electrical consumers are used, the low voltage of the vehicle electrical system is problematic because of the high current intensities. For example, the resulting high losses must be taken into account for the cable cross section rating. If semiconductor elements are additionally used in the powerful consumers, then these must also be dimensioned for the high current levels, which results in increased costs.

SUMMARY OF THE INVENTION

It is the object of the invention to solve the problem of providing an additional, higher direct voltage level $U2$ with a constant voltage for powerful electrical consumers in addition to the lower conventional electrical system voltage $U1$ which may be rated 12V.

In accordance with the invention, the problems associated with the prior art are solved by realizing the first lower voltage level through a parallel connection of several chopper stages and wherein the second, higher voltage level is present at the output of the generator and the voltage controller adjusts the first, lower voltage level.

When using power-electronics circuits, such as unidirectional or bidirectional DC/DC converters, it is particularly important to observe the regulations applicable for motor vehicles with respect to the electromagnetic compatibility of these circuits.

If a second, higher direct voltage level $U2$ for powerful consumers is introduced in the motor vehicle in addition to the conventional voltage level $U1$ of rated 12V, and if the two nets are connected with the aid of a chopper, then this chopper must be configured such that it is electromagnetically compatible.

In accordance with the invention and starting with a conventional generator, the introduction of a second, higher voltage level $U2$ is achieved by inserting a power-electronics circuit based on the multi-chopper principle between the generator and the battery.

BRIEF DESCRIPTION OF THE DRAWINGS

The exemplary embodiments and features of the invention are explained in further detail in the following with the aid of the drawing, in which.

DETAILED DESCRIPTION OF THE INVENTION

Figure 1:
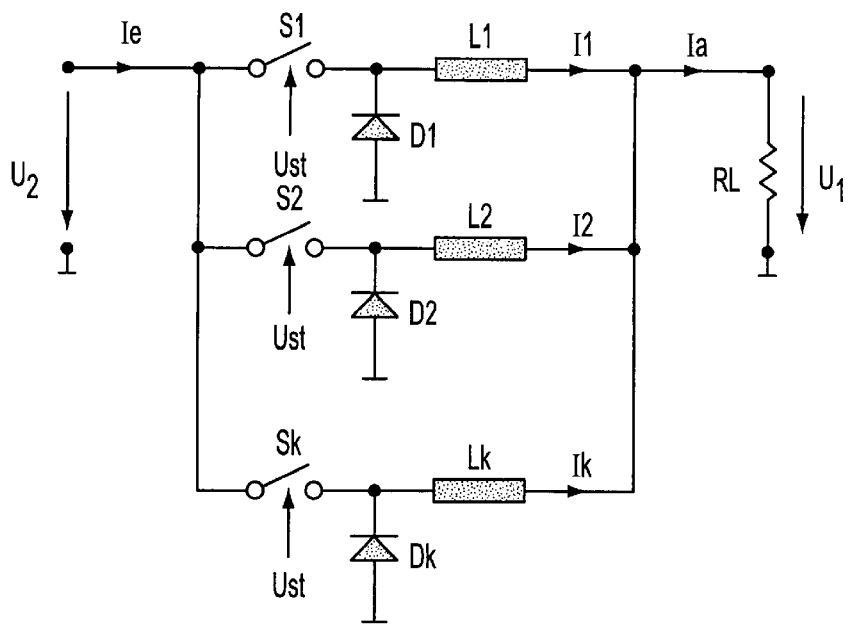
FIG. 1 shows a wiring diagram for a multi-chopper according to the invention.

The mode of operation for the inserted multi-chopper 4 is described in the following. A multi-chopper consists of several parallel-connected chopper stages (up/down converter), e.g. as shown in FIG. 1. Known problems with choppers of this type with respect to EMC (electromagnetic compatibility) are ones with a pulse-type input voltage and a pulse-type output voltage during the operation without an additional reactor or inductor. If a continuous variation of the output voltage $U1$ is omitted and the arrangement is limited to a specific number of discretely adjustable output voltage levels, then the use of several choppers in combination will make it possible to improve the EMC of the circuit considerably by smoothing the currents Ie and Ia and avoiding a pulse-type output voltage $U1$.

In accordance with FIG. 1, several chopper stages (1, 2, . . . k) are connected in parallel, so that the load current can distribute to the actuated branch currents I1, I2 . . . Ik, depending on the control pattern Ust1, Ust2, . . . Ustk. As a result of this, the necessary components can be dimensioned for a lower current. Owing to the installed reactors L1, L2, . . . Lk as well as the separate freewheeling circuits, the individual stages are decoupled via the freewheeling diodes D1, D2, . . . Dk and do not mutually influence each other. The decoupling is, thus, accomplished for each stage or branch of the multi-chopper. The number of active stages that are operational can deviate from the total number of chopper stages, depending on the desired voltage ratio. This means that not all branches must constantly be current-carrying.

The electronic switches S1, S2, . . . Sk are controlled in such a way that the number of actuated branches remains constant over a clock cycle. However, depending on the number of stages k, this condition can be met only for specific discrete keying ratios and thus voltage conditions (fractions or multiple of the input voltage Ue). It follows from this that the more precise the gradation of the voltage levels, the higher the number of parallel-connected chopper stages that must be selected.

The voltage levels that can be reached in dependence on the total number of stages (k), as well as the associated combinations of active and simultaneously actuated branches (m, n) are shown in the form of a matrix in the table. The elements of the matrix (a[n,m]) indicate the possible voltage ratios for the respectively selected combination.

TABLE

| | | combination matrix | | | | |
|---|---|---|---|---|---|---|
| | m | 1 | 2 | 3 | 4 | ... k |
| n | | | | | | |
| 1 | | 1 | 1/2 | 1/3 | 1/4 | ... 1/k |
| 2 | | | 1 | 2/3 | 2/4 | ... 2/k |
| 3 | | | | 1 | 3/4 | ... 3/k |
| 4 | | | | | 1 | ... 4/k |
| ... | | | | | | ... |
| k | | | | | | 1 |

Meaning therein:

k: Total number of existing stages, m: number of active stages that are operational, n: number of simultaneously actuated stages.

The following applies:

n<m<k

The output voltage can be calculated based on the following equation 1:

$$U1=a[n,m] \times U2.$$

Figure 2A:
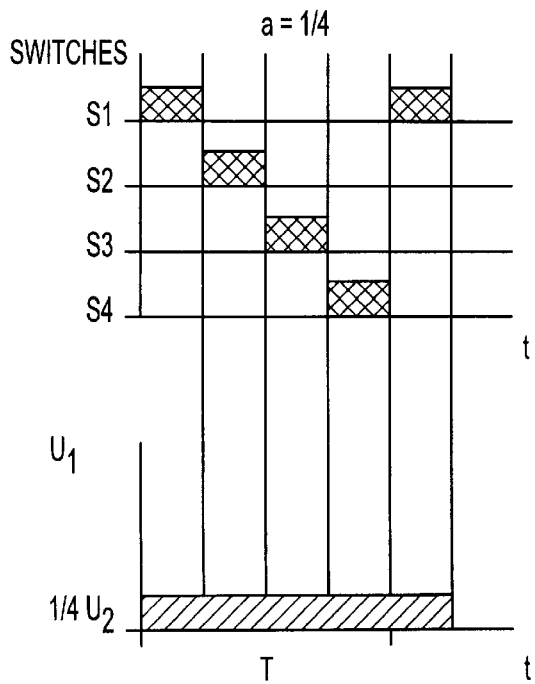
FIG. 2 represents an example for the voltage generation of a multi-chopper with four electric switches.
Figure 2B:
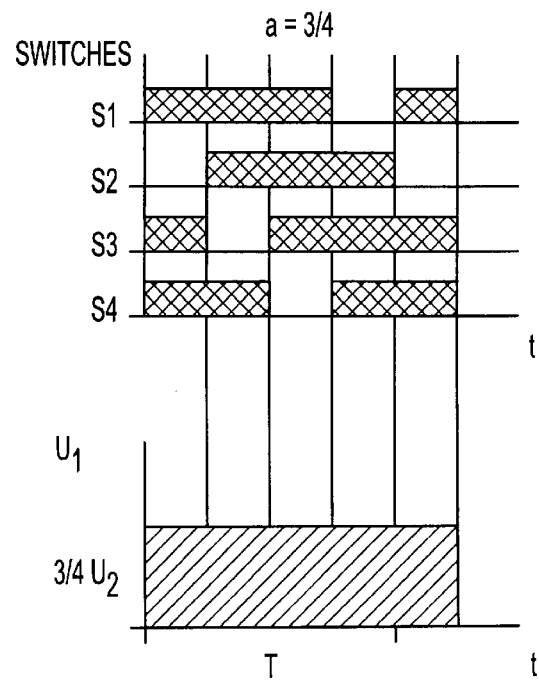

The paths of the individual control patterns Ust of the active stages have the same keying ratio and are phase-displaced against each other. The clock pulse rate for the signals (1/T) remains constant, regardless of the number of operational branches. FIG. 2 shows the actuation pulse repetition for an arrangement with four electronic switches and the adjusted voltage ratios 1/4 and 3/4. For each time interval it is clearly visible that the same number of stages are actuated.

Figure 3:
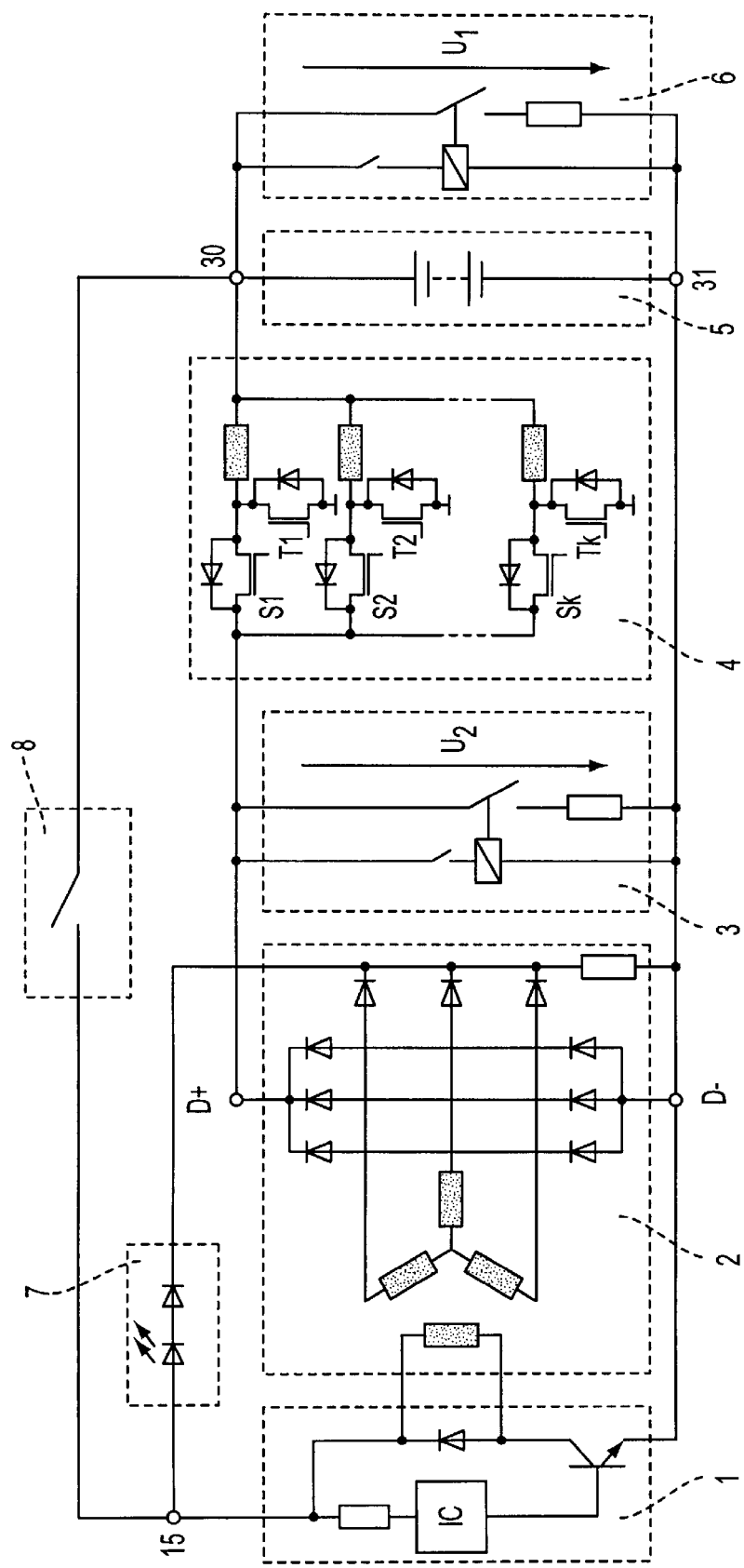
FIG. 3 is a circuit for the vehicle electrical system with a multi-chopper according to the invention.

The described power-electronics circuit of a multi-chopper is thus incorporated into the total vehicle electrical system to produce a second, higher voltage level U2 in accordance with the arrangement shown in FIG. 3. The following components are used for this: a conventional generator controller 1 for adjusting the battery voltage to 12V, a generator with rectifier 2, a multi-chopper 4 and a charge control 7. The generator G is excited once the ignition 8 is switched on. The multi-chopper 4 is a freewheeling electrical circuit since the electronic switches S1, S2, . . . , Sk are to be protected from the negative half wave of the generator. This can be seen, referring to FIG. 3, in the fact that, the multi-chopper 4 is connected to the vehicle electrical system only through D+. Likewise, transistors T1, T2, . . . , Tk are similarly protected.

The 12V generator controller (IC) is connected to the exciter coil of the generator. Its function is to adjust the battery voltage U1 to the desired value of rated 12V by varying the exciter current that is effective as correcting variable in the control circuit. A conventional IC voltage controller for motor vehicle generators can be used for this. The energy supply for the exciter circuit, as well as the measuring of the voltage to be controlled does not take place via exciter diodes in the generator, as is standard, but via the switched battery voltage at terminal 15. Thus, the battery voltage is controlled directly, as desired. The voltage released by the generator G to the load 3 is, of course, the voltage U2 of the higher voltage level. Load 3 is illustrative of a high power consumption device requiring voltage U2.

The generator G with exciter and three-phase stator winding generates a three-phase voltage system, the amplitude of which can be adjusted via the exciter current. One or several rectifier bridges are used for the rectifying. The multi-chopper, which has already been described in detail, is connected between generator and battery. In accordance with equation 1, this power-electronics circuit generates an output voltage U1 where U1=a[n,m]×U2, which depends on the number of parallel and active branches and the control pulse sequences. However, since the battery voltage is adjusted via the exciter circuit to a rated 12V value, this means according to equation 1 that the input voltage or the voltage generated by the generator adjusts itself on the basis of the following equation:

$$U2=U1/a[n,m].$$

This results in a vehicle electrical system with a second, higher voltage system U2, for which the amplitude can be adjusted depending on the design and actuation of the multi-chopper. The voltage for the battery-buffered system in this case is adjusted to the desired value of rated 12V, regardless of the amplitude and the load for the second, higher voltage system U2. The controller 1 is provided with the control circuit IC for this. Currently, electrical systems for vehicles are regulated by the exciter diodes in the generator and the output voltage of the generator is regulated and adjusted to a certain level. In contrast, in the vehicle electrical system as set forth herein, the battery voltage at terminal 30 is controlled and adjusted to a certain level and the generator is regulated directly via terminal 15 and the ignition switch. That is, the output voltage level U2 of the generator is determined by the multi-chopper, which sets the ratio of U2/U1. The advantage of adjusting the voltage level at the battery is that a regulated voltage level U2 is automatically available at the output of the generator. Any attempt to control the output level of the generator would result in the multi-chopper setting the lower voltage level U1 according to the output of the generator.

The 12V loads 6 can be connected to the output of the multi-chopper 4, which in this case functions as a buck converter. Load 6 is illustrative of a lower power consumption device requiring voltage U1. Possibly required relay exciter coils can be supplied either from terminal 30, from terminal 15 or directly from a rectifier bridge that is integrated into the generator. One essential advantage of the arrangement is that the voltage waviness in the battery-buffered system can be reduced. The voltage generated in the generator has a waviness that is superimposed on the direct voltage and is directly applied to the battery and thus the consumers. In the suggested arrangement, the voltage waviness is reduced in accordance with the equation:

$$dU1=a[n,m] \times dU2.$$

Powerful consumers such as load 3 can be connected to the higher direct voltage system U2, generated directly by the generator, the voltage amplitude of which depends on the multi-chopper 4 that is used. The possibly required relay exciter coils in this case can also be supplied either from terminal 30, terminal 15, the voltage system U2 or directly from a rectifier bridge that is integrated into the generator.

If the generator is idle, the flow of energy from U1 to U2 can be reversed in a simple way by closing the switches T1 . . . Tk. The multi-chopper 4 then functions as a boost converter for the battery voltage U1.

The voltage state of the voltage generator can be displayed optically, for example, with the aid of the charge control shown in FIG. 3. A light-emitting diode (LED), for example, is connected between terminal 15 and the illustrated center point of the 3-pulse center tap connection. The ohmic resistance between the center tap connection and terminal D−, which is shown here as well, functions in this case as current-limiting series resistor for the LED. As long as the generator voltage is lower than the battery voltage present at terminal 15, the LED emits light. The light goes off as soon as the generator voltage reaches the value of the battery voltage.

A vehicle electrical system, provided with a second, higher voltage level U2 by using a multi-chopper arrangement, has the following advantageous features:

- the battery voltage U1 is controlled directly through measuring of the voltage at terminal 15;
- the amplitude of the second, higher voltage level U2 can be adjusted in stages, depending on the design and actuation of the multi-chopper;
- power can be provided without influencing the battery-buffered voltage system;
- the voltage waviness in the battery-buffered voltage system can be reduced and
- the loads U2 and U1 can be supplied even if the generator is idle.

The higher voltage level U2 has the following advantages, especially for powerful consumers:

- a reduction of the maximum current is possible;
- the ohmic losses are reduced while the power consumption remains the same;
- it is possible to install lines with a small cross section, which results in a weight advantage;
- a better use of the semiconductor components is possible with respect to the voltage sustaining capacity;
- semiconductor costs are reduced while the power consumption remains the same because the necessary chip surface is smaller;
- the semiconductor losses are reduced while the power consumption remains the same;
- reduced semiconductor losses mean a lower cooling expenditure, which in turn results in a weight advantage;
- the effectiveness of the terminal stages increases; and
- the maximum converter capacity is increased for the same chip surface.

We claim:

1. A vehicle electrical system with a first lower voltage level U1 and with a second higher voltage level U2 comprising:

an ignition switch;

a battery in series with said ignition switch;

a generator having an exciter circuit and a voltage controller, said voltage controller supplying energy to said exciter circuit via the ignition switch in order to adjust said first lower voltage level to a first rated level; and a multi-chopper having a plurality of chopper stages connected in parallel, said multi-chopper connected between the battery and the generator, thereby adjusting the second higher voltage level to a second rated level based on the number of chopper stages and their actuation.

2. A vehicle electrical system according to claim 1, wherein said second voltage level represents the voltage at the generator, the level of which follows from the first voltage level of 12 V through an adjustable transformation ratio (a).

3. A vehicle electrical system according to claim 1, wherein each stage of said parallel-connection of several chopper stages comprises a switch (S), a reactor, and a diode (D) that together form a T-shaped arrangement, wherein the diode is connected to point in a direction so as to cause continuous current flow in the reactor and a load.

4. A vehicle electrical system according to claim 3, wherein the diodes are replaced with active components.

5. A vehicle electrical system according to claim 3, wherein the number of parallel-connected chopper stages is inversely proportional to the level of the lowest voltage stage that can be achieved, and that keying ratios for each of the individual parallel-connected chopper stages is constant and phase-displaced against each other, such that the sum of the voltages and currents at the output is constant at any moment.

6. A vehicle electrical system according to claim 3, wherein the switches (S1 . . . Sk) are clocked so that the number of simultaneously actuated switches during a clocking period that depends on the selected frequency is constant.

7. A vehicle electrical system according to claim 3, wherein said parallel-connection of chopper stages is used as a boost converter.

8. A vehicle electrical system according to claim 3, wherein said parallel-connection of chopper stages is used as a buck converter.

9. A vehicle electrical system according to claim 8, wherein said parallel-connection of chopper stages is used as a boost converter.

\* \* \* \* \*